United States Patent [19]

Robertson

[11] Patent Number: 4,766,194

[45] Date of Patent: Aug. 23, 1988

[54] BOWLING BALL HAVING IMPROVED SURFACE SLIP

[75] Inventor: John R. Robertson, Glenn Mills, Pa.

[73] Assignee: ICI Americas Inc., Wilmington, Del.

[21] Appl. No.: 115,577

[22] Filed: Oct. 21, 1987

Related U.S. Application Data

[63] Continuation of Ser. No. 21,111, Mar. 3, 1987, abandoned.

[51] Int. Cl.$^4$ ................. C08L 75/00; G08G 18/38
[52] U.S. Cl. ........................... 528/28; 528/49; 528/67; 528/73; 528/76; 528/77; 528/80; 273/63 R; 273/63 G
[58] Field of Search ............... 528/28, 49, 67, 73, 528/76, 77, 80

[56] References Cited

U.S. PATENT DOCUMENTS

| | | | |
|---|---|---|---|
| 3,068,007 | 12/1962 | Satchell | 273/63 |
| 3,318,727 | 5/1967 | Boenig et al. | 117/118 |
| 3,395,109 | 7/1968 | Molitor et al. | 260/22 |
| 3,979,126 | 9/1976 | Dusbiber | 273/218 |
| 4,131,277 | 12/1978 | Randolf | 273/63 D |
| 4,253,665 | 3/1981 | Miller et al. | 273/63 G |
| 4,268,034 | 5/1981 | MacDonald | 273/63 C |
| 4,309,377 | 1/1982 | Miller et al. | 264/294 |
| 4,461,478 | 7/1984 | Lee et al. | 273/63 R |
| 4,477,366 | 10/1984 | Robertson | 252/182 |
| 4,498,929 | 2/1985 | Robertson | 106/38.2 |
| 4,504,313 | 3/1985 | Robertson | 106/38 |
| 4,529,200 | 7/1985 | Miller et al. | 273/60 B |
| 4,546,154 | 10/1985 | Robertson | 525/474 |
| 4,598,909 | 7/1986 | Ventura et al. | 273/60 B |
| 4,603,861 | 8/1986 | Arnott et al. | 273/63 R |
| 4,678,513 | 7/1987 | Bagaglio et al. | 106/38.22 |

OTHER PUBLICATIONS

Chem. Abstracts 99:176963z, 1983.
Chem. Abstracts 80:15957t, 1974.
Chem. Abstracts 83:60869p, 1975.

*Primary Examiner*—Maurice J. Welsh
*Attorney, Agent, or Firm*—James T. Jones

[57] ABSTRACT

A bowling ball having at least an outer portion fabricated from the reaction of reactants comprising
  (i) a polyisocyanate,
  (ii) an active hydrogen-containing compound having an average functionality of at least 2.0, and
  (iii) a slip agent compound containing a moiety which imparts lubricity to said ball, said slip agent compound also having at least one active hydrogen-containing group which is reactive with isocyanate groups, said slip agent compound being present in an amount between about 0.5 and about 5 weight percent based on the weight of (i) and (ii), the ratio of (i) to the total of (ii) plus (iii) being such that the reaction is conducted at an isocyanate index between about 0.90 and about 1.30.

38 Claims, No Drawings

BOWLING BALL HAVING IMPROVED SURFACE SLIP

This is a continuation of copending application Ser. No. 021,111 filed on Mar. 3, 1987 now abandoned.

FIELD OF THE INVENTION

This invention relates to bowling balls made from a molded polyurethane, polyurea, or polyurethaneurea elastomer which has a reduced coefficient of friction, relative to conventional bowling balls, between the ball and the lane surface with which it is in contact. More specifically, the reduced frictional coefficient results from a slip agent which is reacted into the elastomer and which, therefore, is permanent and does not exude from the ball.

BACKGROUND OF THE INVENTION

Bowling balls fabricated in such a manner that their coefficient of friction, with respect to lane surfaces is increased, are known. U.S. Pat. Nos. 4,309,377 to Miller, Jr. et al. and 4,253,665, also to Miller, Jr. et al., for example, disclose a polymer alloy bowling ball having a continuous thin film on its surface which provides an increased coefficient of friction between the bowling ball and the bowling lane surface. The thin film is created by including a plasticizer in the resin formulation used to make the outer shell of the ball, which plasticizer then exudes through the outer shell to form the film.

U.S. Pat. No. 3,517,933 to Malkin discloses a game ball having an inner and outer shell wherein the inner shell is provided with a fixed weight at a point on its inner periphery to provide frictional drag as the ball is rolled.

U.S. Pat. No. 4,131,277 discloses a surfacing composition for bowling balls consisting of a mixture of a functionally terminated liquid rubber blended with a considerably greater quantity of liquid resin hardenable by a chemical reaction. The patent states that the liquid resin is set to form a hard matrix while the liquid rubber forms an elastomer by chain lengthening with segregation of elastomer material in microscopic domains which are chemically bonded to the surrounding matrix. The result is stated to be a bowling ball having improved frictional engagement with the bowling lanes.

U.S. Pat. No. 3,318,727 discloses polyester bowling balls surface treated with a composition capable of disposing reactive groups thereon, e.g. monoisocyanate or polyisocyanate. The resulting surface is stated to be hardened and to have improved scratch and abrasion resistance.

SUMMARY OF THE INVENTION

This invention provides a bowling ball having at least an outer portion fabricated from the reaction of reactants comprising
(i) a polyisocyanate,
(ii) an active hydrogen-containing compound having an average functionality of at least 2.0, and
(iii) a slip agent compound containing a moiety which imparts lubricity to said ball, said slip agent compound also having at least one active hydrogen-containing group which is reactive with isocyanate groups, wherein said slip agent compound is present in an amount between about 0.5 and about 5 weight percent based on the weight of (i) and (ii), the ratio of (i) to the total of (ii) plus (iii) being such that the reaction is conducted at an isocyanate index between about 0.90 and about 1.30.

"Polyisocyanate", as used above and in the claims, refers to mixtures of polyisocyanates as well as to single species thereof. "Active hydrogen-containing compound" and "slip agent compound" are used in like manner to refer to mixtures containing two or more species of each as well as single species of each.

"Lubricity" imparted to a bowling ball, for purposes of this invention, denotes that the friction of the ball surface, when in rolling or sliding contact with a smooth surface such as a bowling lane, is lower relative to a ball identical therewith except that it does not contain a slip agent compound.

By this invention a bowling ball is provided which can be of conventional construction in the sense that it can have a single (solid) outer shell placed about a (usually rigid foam) core. The outer shell is fabricated from reactants comprising a polyisocyanate and an active hydrogen-containing compound such as a polyol, a polyamine, or a mixture thereof in which case the outer shell material is classed, respectively, as a polyurethane, a polyurea, or a polyurethaneurea. Slip is built directly into the polymer material used to make the bowling ball by virtue of including, as a reactant, a compound (herein also called a slip agent or slip agent compound) having a moiety which imparts lubricity to the ball and at least one group which is reactive with isocyanate groups in the polyisocyanate. This slip agent itself is thus an active hydrogen compound.

"Slip" as used herein denotes that the slip agent imparts lubricity to the ball surface such that friction between the ball and the lane surface is lowered relative to a ball identical but for inclusion of the slip agent. By virtue of its isocyanate-reactivity, the compound actually becomes part of the polymer, and is not susceptible to being removed by normal usage or by the act of merely wiping the ball off if it is desired to clean it, as would a film which is not an integral part of the polymer. Moreover, because it is actually part of the polymer used to make the ball, the slip agent remains evenly distributed throughout the outer shell, in contrast to an unbound slip agent which is free to migrate through the shell continuously to the surface, eventually to be lost following repeated cleanings or through normal wear. The bowling ball of this invention can also be machined, if desired, to expose fresh surface which has the same slip properties as prior to machining. The slip agent is, in this sense, renewable.

It will, of course, be appreciated by those skilled in the art that it is additionally possible to fabricate solid bowling balls or balls having multiple shells or cores, and it is understood that this invention is also applicable to these and other types of constructions if at least the outer portion of those constructions contains slip agents as disclosed herein. The invention is applicable to any of the well known variations of bowling, including tenpins, duckpins, and candlepin bowling.

Because of the surface slip or lubricity exhibited by the bowling balls of this invention, the balls in turn exhibit more consistent performance under varying lane conditions. They have also proven to be particularly effective on the new, so-called "short oil" lanes recently introduced in the sport of bowling, which lanes are oiled for a portion of their length and unoiled for the rest.

Importantly, balls having an outer portion made from conventional polyurethanes have been criticized as causing more-than-normal damage to bowling lanes. See "Rubber and Plastics News", p. 42, Nov. 17, 1986 where it is stated that because both the balls and lane coating are made from polyurethane, the balls remove more of the coating because of the similar chemistry. The article states that the damage is caused because the urethane bowling balls have a higher coefficient of friction-which gives them better traction—than rubber or plastic balls as they roll over the bowling lane surface. The bowling balls of this invention, because they incorporate directly into the polyurethane slip agent compounds which reduce friction between the ball and the lane surface, substantially reduce wear of lane surfaces relative to that caused by conventional (not containing a slip agent compound) polyurethane balls.

DETAILED DESCRIPTION OF THE INVENTION

Suitable active hydrogen-containing compounds, component (ii), for use in this invention include polyether polyols, polyester polyols, and amine-terminated polyethers. The polyols preferably possess a hydroxyl number of from about 20 to about 150, preferably from 28 to 56. Such limits are not intended to be restrictive but are merely illustrative of the large number of possible combinations of the polyol or polyols used. The relatively high molecular weight hydroxyl-containing polyols which can be employed herein are those polyether and polyester polyols which have an average hydroxyl functionality of from 2 to 4, preferably from 2 to 3 and an average hydroxyl equivalent weight of from 500 to 3000, preferably from 1000 to 2000, including mixtures thereof.

Suitable relatively high molecular weight Polyether polyols which can be employed herein include those which are prepared by reacting an alkylene oxide, halogen substituted or aromatic substituted alkylene oxide or mixtures thereof with an active hydrogen-containing initiator compound.

Suitable oxides include, for example, ethylene oxide, propylene oxide, 1,2-butylene oxide, 2,3-butylene oxide, styrene oxide, epichlorohydrin, epibromohydrin, mixtures thereof and the like.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high molecular weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4',4''-triamine, 4,4'-di(-methylamino)-diphenylmethane, 1-methyl2-methylamino-4-aminobenzene, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Suitable polyester polyols which may be employed herein include, for example, those prepared by reacting a polycarboxylic acid or anhydride thereof with a polyhydric alcohol. The polycarboxylic acids may be aliphatic, cycloaliphatic, aromatic and/or heterocyclic and may be substituted (e.g., with halogen atoms) and/or unsaturated. Examples of carboxylic acids of this kind include succinic acid; adipic acid; suberic acid; azelaic acid; sebacic acid; phthalic acid: isophthalic acid; trimellitic acid; phthalic acid anhydride; tetrahydrophthalic acid anhydride: hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids, such as oleic acid, which may be in admixture with monomeric fatty acids, terephthalic acid dimethyl ester; terephthalic acid bisglycol ester and the like. Mixtures of such acids or anhydrides may also be employed.

Examples of suitable polyhydric alcohols include ethylene glycol, 1,2-propylene glycol; 1,3-propylene glycol; 1,4-, 1,2- and 2,3-butylene glycol; 1,6-hexane diol; 1,8-octane diol; neopentyl glycol; cyclohexane dimethanol (1,4-bis-hydroxy-methyl. cyclohexane) 2-methyl-1,3-propane diol; glycerol; tri-methylol propane; 1,2,6-hexane triol; 1,2,4-butane triol tri-methylol ethane; pentaerythritol; quinitol; mannitol; sorbitol; methyl glycoside; diethylene glycol; triethylene glycol; tetraethylene glycol; polyethylene glycol; dipropylene glycol; polypropylene glycols; dibutylene glycol; polybutylene glycols and the like. The polyesters may contain some terminal carboxyl groups. It is also possible to use polyesters of lactones such as caprolactone, or hydroxy carboxylic acids such as hydroxy caproic acid.

Other polyols which can be employed herein include polymer-containing polyols such as, for example, those disclosed in U.S. Pat. Nos. Re. 29,118 (Stamberger), Re. 28,715 (Stamberger), Re. 29,014 (Pizzini et al.) and 3,869,413 (Blankenship et al.) all of which are incorporated herein by reference.

In addition to those above-described polyols are the polymer/polyol blends which are normally liquid stable polymer/polyol compositions formed by polymerizing in the presence of a free radical catalyst from about 10 to about 50 weight percent of a mixture of an ethylenically unsaturated monomer such as acrylonitrile or styrene of mixtures thereof dissolved or dispersed in a polyol mixture.

Amine terminated-equivalents of the above described polyols and blends therewith can be used in making polyurea and polyureaurethanes. Polyoxyalkylene polyamines and cyano-alkylated polyoxyalkylene polyamines having a molecular weight of 1000–10,000 with a preferred range of 2000 to 7000 which have the general formula;

$H_2NCH_2\text{-}CXH(OCH_2CHX)_yNH_2$ where X is H or alkyl group having 1–18 carbon atoms and where y is a number of about 20–200, and triamines of poly-alkoxylated trimethylol propane having the general formula:

$CH_3CH_2C[CH_2(OCH_2\text{-}CHX)_zNH_2]_3$ where z is an average of 10–100 are also useful materials for the blends of the invention. These amines can be prepared according to the procedure outlined in a U.S. Pat. No. 3,666,788 the teachings of which are hereby incorporated by reference. These materials have the general formula:

$$R[(OCH_2CHX)_nOCHYCHZNHA]_m$$

where R is the nucleus of an oxyalkylation-susceptible aliphatic polyhydric alcohol containing 2–20 carbon atoms and 2–6 hydroxyl groups, A is hydrogen or a cyano or lower alkyl radical having one or two carbon atoms between the nitrogen and cyano radical provided at least one A is a cyano-lower-alkyl radical, Z is an alkyl group containing 1–18 carbon atoms, n has an average value 10–100 and m is 2–6, R is saturated and consists of carbon and hydrogen. The methyl and ethyl alkyl groups of A may be substituted by lower alkyl groups.

The blends may include lower molecular weight polyols and polyamines than those listed above.

Suitable polyisocyanates, component (i), include those organic compounds that contain at least two isocyanate groups. The polyisocyanates have an average isocyanate functionality of 1.9–2.5, preferably 2.0–2.3. Such compounds are well known in the art.

The preferred polyisocyanates used in the invention are aromatic derivatives which are preferably liquids at room temperatures. Suitable materials are readily commercially available such as the isomers of toluenediisocyanate, diphenylmethane diisocyanate (MDI) and methylene bridged polyphenylmethane polyisocyanates (also known as polymeric MDI). Many of the polyphenyl polymethylene polyisocyanates which are prepared by aniline formaldehyde condensations followed by phosgenation ("crude MDI"), and MDI which has been modified to contain carbodiimide groups, uretonimine groups, urethane groups, sulfonate groups, isocyanurate groups, urea groups or biuret groups and derivatives thereof containing minor amounts of pre-reacted low molecular weight polyols such as ethylene glycol and propylene glycol or hydroxy esters to form stable liquids are useful. MDI containing carbodiimide groups, uretonime groups, urethane groups, sulfonate groups, isocyanurate groups, urea groups, or biuret groups are preferred and can be obtained as known in the art as distillation fractions taken following the preparation of polymeric MDI. MDI modified as described above and blended with polymeric MDI is also preferred. Such combinations are readily available and well known in the urethane manufacturing art. Of interest to this invention are compositions containing 4,4'-diphenylmethane diisocyanate which is a quasi prepolymer containing about 10 weight % or about 0.1–0.3 mol percent of low molecular weight polyols such as propylene glycol, butylene glycol, ethylene glycol and poly-1,2-propylene ether glycols having a molecular weight of from 134 to 700. Of additional suitability for use in the invention are carbodiimide and uretonimine modified derivatives of diphenylmethane diisocyanates which have been further modified by the addition of high molecular weight polyols such as polyether diols and triols having a molecular weight of 1000–8000.

The preferred polyisocyanates used with an active hydrogen-containing compound according to the invention are aromatic derivatives which are liquids at room temperatures. Such materials are readily commercially available such as the isomers of toluene diisocyanate, diphenylmethane diisocyanate and methylene bridged polyphenylmethane polyisocyanates.

Room temperature liquid derivatives of 2,4- and 4,4'-diphenylmethane diisocyanate containing carbodiimide groups, uretonimine groups, urethane groups, sulphonate groups, isocyanurate groups, urea groups or biuret groups and derivatives thereof containing minor amounts of prereacted low molecular weight polyols such as propylene glycol and butylene glycol or hydroxy esters to form stable liquids are useful.

Many of the polyphenyl polymethylene polyisocyanates which are prepared by aniline formaldehyde condensations followed by phosgenation (crude MDI) may be used and similar derivatives as described for 2,4 and 4,4' diphenylmethane diisocyanate together with mixtures of these.

Similar derivatives of toluene diisocyanate may be prepared and used alone or as mixtures with the 2,4- and 4,4'-diphenylmethane diisocyanate derivatives.

Suitable aliphatic polyisocyanates include isophorone diisocyanate; 1,6-hexamethylene diisocyanate; 1,4-cyclohexyl diisocyanate; saturated analogues of the above mentioned aromatic polyisocyanates, mixtures thereof and the like. If aliphatic polyisocyanates are employed, they are preferably used alone, but can be used as a blend with an aromatic polyisocyanate. If a blend is used the weight ratio of aliphatic polyisocyanate to aromatic polyisocyanate can vary in all proportions.

Useful as a slip agent/active hydrogen compounds, component (iii), are fatty alcohols containing from 10–40 carbon atoms in the fatty hydrophobic tail, preferably 15–40 carbon atoms, and most preferably 16–30 carbon atoms. The fatty alcohol hydrophobic tail is preferably completely saturated, although some unsaturation can be tolerated without negating its slip function. Branching is also desirable. m—

Examples of suitable fatty alcohols include n-decyl alcohol, n-undecyl alcohol, n-dodecyl alcohol, n-tetradecyl alcohol, n-hexadecyl alcohol, n-octadecyl alcohol, and isostearyl alcohol. Suitable fatty alcohols are readily commercially available, for example from the Chemical Specialties Division of Henkel under the name "PRIMAROL".

Also useful as slip agents are secondary monoamines of the formula $$R^1\text{-NH-}R^2$$

wherein $R^1$ is an aliphatic hydrocarbon group having from 10–40 carbon atoms, preferably 15–40 carbon, and most preferably 16–40 carbon atoms, and $R^2$ is an aliphatic hydrocarbon group containing 1–20 carbon atoms, preferably 1–6 carbon atoms. Branched saturated hydrocarbon groups are preferred as $R^1$ and $R^2$. Suitable long chain secondary monoamines are available from General Mills under the trademark ALAMINE and include N-dodecyl-1-dodecanamine: N-tetradecyl-1-tetradecanamine; N-hexadecyl-1-hexadecanamine; and N-octadecyl-1-octadecanamine. Preferred are secondary amines obtainable from Sherex Corp. under the designation ADOGEN, including di tridecyl amine (ADOGEN 283) and di hydrogenated tallow amine (ADOGEN 240).

Slip agents suitable for use herein are also disclosed as internal mold release agents in U.S. Pat. No. 4,504,313, commonly assigned, and can consist essentially of 0.5–20 mol % of $R_aR'_bSiO_{[4-(a+b)]/2}$ Units and from 99.5–80 mol % of $R''_cSiO_{(4-c)/2)}$ units where R is an isocyanate reactive organic radical,
a has an average value of from 1–3,
R' and R'' are hydrocarbon radical or a substituted organic radical,
b has an average value of 0–2,
a+b is from 1–3,
c has an average value from 1 to 3, and wherein
(d) the ratio of the total molecular weight to the total number of isocyanate reactive functional groups in the polysiloxane molecule (equivalent weight) ranges from 100–3500;
(e) the combined formula weights of all isocyanate reactive organic radicals, R do not exceed 40% of the total molecular weight of the slip agent;
(f) the combined formula weights of all non-isocyanate reactive radicals, R'+R'' together do not exceed 40% of the total molecular weight of the polysiloxane slip agent;
(g) the combined formula weights of all the organic radicals R+R'+R'' in the molecule together do not exceed 55–60% of the total molecular weight of the molecule:
(h) the polysiloxane slip agent(s) each contain an average of at least two isocyanate reactive functional groups per molecule;
(i) at least two of the isocyanate reactive functional groups in each molecule are located on separate organic radicals, R, attached independently to different silicon atoms in the polysiloxane molecule:
(j) the isocyanate reactive functional groups which may be employed in the polysiloxane molecule(s) can be any of the following types:
    (1) alcohols,
    (2) phenols,
    (3) thiols,
    (4) primary or secondary aromatic amines, which contain no oxygen, and have not more than one nitrogen atom attached directly to, in conjugation with, or incorporated within, the aromatic ring nucleus,
    (5) secondary aliphatic amines wherein at least one of the alkyl carbon atoms, bonded directly to the nitrogen atom, is not a primary carbon atom, The groups may be used independently or in any combination which is consistent with conditions a–f:
(k) the molecular weight of the polysiloxane slip agent is between 1000 and 30,000, preferably 2000–15,000 and most preferred 4000–8000.
(l) the polysiloxane slip agent(s) are substantially insoluble in liquid polyisocyanates, especially those named hereinbefore.

In these slip agents the hydroxy, mercapto, or amino organic R radicals having preferably a molecular weight in the range of 100–400 can be attached to the silicon atom directly to carbon or through oxygen, nitrogen or sulfur carbon bonds. Particularly preferred R radicals are those of the formula HO—R'''—, $H_2N$—R'''—, $HNR_2'''$, HS—R'''—, wherein R''' is a divalent linking group composed of carbon and hydrogen; carbon, hydrogen and oxygen; carbon, hydrogen and sulfur; carbon, hydrogen and nitrogen; or carbon, hydrogen, oxygen and nitrogen. Specific examples of R''' include the methylene, ethylene, propylene, hexamethylene, decamethylene, —$CH_2CH(CH_3)$—$CH_2$—, phenylene, butyl phenylene, naphthylene, —$CH_2CH_2SCH_2CH_2$—, —$CH_2CH_2OCH_2$—, —$CH_2CH_2$—$C_H2$—$O(C_H2$—$CHR'O)_n$—, where n is 0–5 where R' is described as above or (H). A preferred R group is —$CH_2CH_2CH_2O(CH_2CH(CH_3)O)_nH$ where n=1–5 and has an hydroxyl equivalent weight of 500–2000. It is preferred that the R''' linking group contains from 3–10 atoms in addition to hydrogen atoms. There can be from 1–33 functional R radicals, preferably 3–10, and from 1–3 attached to a silicon atom.

As indicated above, the R' radical can be any hydrocarbon or substituted organic radical. Illustrative of the R' radicals that can be present are alkyl radicals such as the methyl, ethyl, propyl, butyl, amyl, hexyl, octyl, decyl, dodecyl, and octadecyl, and myricyl radicals, alkenyl radicals such as the vinyl, allyl, and hexenyl radicals; cycloalkyl radicals such as the cyclobutyl and cyclohexyl radicals; aryl radicals such as the phenyl, xenyl and naphthyl radicals; aralkyl radicals such as the benzyl and 2-phenylethyl radicals; alkaryl radicals such as the tolyl, xylyl and mesityl radicals; the corresponding halohydrocarbon radicals such as 3-chloropropyl, 4-bromobutyl, 3,3,3-trifluoropropyl, chlorocyclohexyl, bromophenyl, chlorophenyl, alpha, alpha, alphatrifluorotolyl and the dichloroxenyl radicals: the corresponding cyanohydrocarbon radicals such as 2-cyanoethyl, 3-cyanopropyl and cyanophenyl radicals: the corresponding radicals such as ether and ester hydrocarbon radicals such as —$(CH_2)_3OC_2H_5'$ $(CH_2)_3OCH_3'$ $(CH_2)_3COOC_2H_5'$ and $(CH_2)_3COOCH_3$, the corresponding thioether and thioester hydrocarbon radicals such as —$(CH_2)_3SC_2H_5$ and —$(CH_2)_3COSCH_3$; and nitrohydrocarbon radicals such as the nitrophenyl and 3-nitro-propyl radicals. It is preferred that the R' radical be an organic radical containing from 1 to 10 atoms. In the most preferred embodiment of this invention at least 90 percent of all the R' radicals are methyl radicals. There can be an average of from 0 to 2 R' radicals attached to the silicon atom, i.e., b has an average of from 0 to 2 in the above formula.

The R'' radical in the functional isocyanate reactive siloxanes of this invention can also be any hydrocarbon or substituted hydrocarbon radical. The illustrative examples given with respect to R' above are equally applicable here and are not repeated for the sake of brevity. Likewise, the preferences set forth for R' above also apply to the R'' radical. There can be from 0 to 3 R'' radicals, on the average, per silicon atom, i.e., c has an average value of from 1 to 3 in the above formula.

These polysiloxane slip agents can be made by well known techniques and are usually formed by grafting an olefin containing organic modifying group or polyoxyalkylene oxide onto a "Methylhydrogen siloxane" modified polydimethylsiloxane using a platinum catalyzed hydrosilation reaction.

The functional siloxanes of the slip agent can be either solid or liquid in form and are required to be substantially insoluble in isocyanate liquid under the molding conditions employed. In order to use a solid functional siloxane it would be necessary to dissolve, disperse or suspend the siloxane in one or more surfactants. Hence it is much preferred that the functional siloxane employed be either dispersed or dissolved in the active hydrogen-containing compound, component (ii), or if it is desired to combine the siloxane with the polyisocyanate, component (i), that it be in liquid form. While the viscosity of the liquid siloxane can vary over a wide range, for example from 1 to 100,000 cs., it is generally preferred that the viscosity be in the range of from 50 to 1000 cs. Molecular weight can vary from 100 to 30,000, preferably 2000–20,000 and most preferred 4000–8000.

The following are illustrative examples of the types of polysiloxane slip agent compounds which can be used according to the invention.

(I) A hydroxy functional polysiloxane polyether copolymer slip agent compound having the approximate formula:

(CH₃)₃SiO[Si(CH₃)₂O]₆₆[Si(CH₃)(C₃H₆O(CH₂CH(CH₃)O)₂.₉H)O]₃Si(CH₃)₃ having a molecular weight of about 6000, a hydroxy equivalent weight (d) of 2000, (e) is 11%, (f) is 35%, and a viscosity of 160 centistokes which is commercially available (Dow Corning Inc.).

(II) A hydroxy functional thioether copolymer slip agent compound having the speculative formula:

[HOCH₂CH₂SCH₂CH₂CH₂(CH₃)₂SiO][Si(CH₃)₂O]₇₀[Si(CH₃)₂CH₂CH₂CH₂SCH₂CH₂OH]

having a hydroxy equivalent weight (d) of 2750, a molecular weight of 5500, a value for (e) of 4.3%, (f) is 39% and a viscosity of about 55 centistokes.

(III) A polysiloxane having a general formula as follows:

(CH₃)₃SiO[Si(CH₃)₂O]₁₃₄[Si(CH₃)(C₃H₆OC₂H₃(OH)CH₂OH)-O]₁₆Si(CH₃)₃ a molecular weight 13,136, (d) equivalent weight of 411, (e) is 16% and (f) is 33%.

(IV) A polysiloxane having a general formula as follows:

(CH₃)₃SiO[Si(CH₃)₂O]₆₃[Si(CH₃)(C₃H₆OC2H₃(OH)CH₂OH)-O]₇Si(CH₃)₃ a molecular weight 6,154, (d) equivalent weight 440, (e) is 15%, and (f) is 34%.

(V) A polysiloxane having the general formula:

(CH₃)₃SiO[Si(CH₃)₂O]₆₅[Si(CH₃)(C₃H₆OC₂H₃(OH)CH₂OH)-O]₅Si(CH₃)₃ a molecular weight of 5918, (d) equivalent weight 592, (e) is 11%, and (f) is 34%.

(VI) A polysiloxane having the general formula:

(CH₃)₃SiO[Si(CH₃)₂O]₅₆[Si(CH₃)C₃H₆O(C₂H₃(OH)CH₂OH)O]₁₄Si(CH₃)₃ a molecular weight of 6980, (d) equivalent weight 249, (e) is 26%, and (f) is 28%.

(VII) A polysiloxane having the general formula:

CH₃CH(OH)CH₂OC₃H₆Si(CH₃)₂O[Si(CH₃)₂O]₈₉Si(CH₃)₂C₃H₆OC₂H₄(OH)CH₃ a molecular weight of 6962, (d) an equivalent weight of 3481, (e) is 3.4%, and (f) is 39%.

(VIII) A polysiloxane having the general formula:

(CH₃)₃SiO[Si(CH₃)₂O]₆₆[(CH₃)Si(C₄H₈-PH-NH(C₃H₇)O]₃Si(CH₃)₃ where PH=phenylene a molecular weight of 5782, and equivalent weight (d) of 1927, (e) is 9.9% and (f) is 37%.

(IX) A polysiloxane having the general formula:

(CH₃)₃SiO[Si(CH₃)₂O]₅₅[HOCH₂CHOHCHOHCH(CH₂OH)CH(CH₂OH)Si(CH₃)O]₁.₄Si(CH₃)₃ a molecular weight of 7550, an equivalent weight (d) of 108, (e) is 33% and (f) is 26%.

(X) A polysiloxane having the general formula:

(CH₃)₃SiO[Si(CH₃)₂O]₆₁[(CH₃)Si(C₃H₆OCH₂CH(OH)CH₂OH)O]₉Si(CH₃)₃ a molecular weight of 6390, an equivalent weight (d) of 355, (e) is 19% and (f) is 32%.

The amount of functional siloxanes of this invention incorporated into the polyurethane (or polyurea or polyurethaneurea) can vary from 0.25 to 5 percent by weight of the total polyurethane formulation. While the exact amount will necessarily be determined by individual process and manufacturing considerations, from 0.5 to 2 percent should satisfy most needs.

Bowling balls can be fabricated by reacting: (i) an organic polyisocyanate, (ii) an active hydrogen-containing compound, (iii) a slip agent compound, and (iv) a catalyst for the reaction of (i)-(iii) to produce a bowling ball. The active hydrogen compound/slip agent may, if desired, be blended with conventional polyols or the like to reduce the polysiloxane content to a lower level. Blends in which the resulting polysiloxane content is as low as 0.5 percent by weight of the total are useful for making bowling balls.

The polyurethanes or polyureas useful in this invention can be formulated to contain additives as conventionally known and used in elastomer formulations. A non-exhaustive list of typical additives includes pigments for coloration, fillers to reduce economics or to impart special properties or modify existing properties of the elastomer, stabilizers to protect against chemical degradation such as oxidation or discoloration, defoaming agents to prevent foam formation, catalysts such as amines and organotin compounds conventionally known, biocides to prevent bacterial degradation, and plasticizers to modify physical properties of the elastomer such as hardness.

The amount of additives depends, of course, on the particular additives being used. As a general rule of thumb, the total weight of all additives should not exceed about 20 percent by weight based on the total formulation.

Chain extenders and crosslinkers can also be employed and are incorporated as part of the "B" (active hydrogen) component. A great number of di- or polyfunctional, active hydrogen-containing materials may be used, the most important being diols or polyols (monomers or oligomers), diamines and alkanolamines. Among the most useful are commercially available aliphatic diols and triols such as 1,4-butanediol, 1,6-hexanediol, ethylene-, diethylene-, and dipropylene glycol, neopentyl glycol, as well as low molecular weight adducts of propylene oxide of trimethylolpropane and glycerol as well as simple polyhydric alcohols such as trimethylolpropane, glycerol and 1,2,6-hexanetriol. Aromatic, cycloaliphatic and heterocyclic diols include 1,4-bis(hydroxyethyl) hydro-quinone, bis(hydroxyethyl)- and bis (2-hydroxypropyl) bisphenol A, hydrogenated bisphenol A(2,2-bis(4-hydroxycyclohexyl) propane, cyclohexane 1,4-diol, and 1,4-bis(hydroxyethyl) piperazine. Bis (2-hydroxypropyl) isophthalate (Arco Chemical Co.) and bis (2-hydroxyethyl) carbamate (Jefferson Chemical Co.) can also be used, as can low molecular weight, hydroxyl-terminated polyesters, including poly(caprolactones), have also been employed as chain extenders.

Amino alcohols and tertiary nitrogencontaining diols and polyols can also be used as chain extenders, and in the case of triols and tetrols also as crosslinking agents. The presence of the tertiary amine in these molecules can have a catalytic effect on the reaction of isocyanate groups with polyols and thereby enhance their reactivity. Examples of difunctional amino alcohols are ethanolamine, diethanolamine, N-methyl-diethanolamine, bis (2-hydroxyethyl)-and bis (2-hydroxy-propyl) aniline, and bis alkanol derivatives of piperazine or 2-methyl-piperazine. Triethanolamine as well as oxyalkylated products of triethanolamine, ethylenediamine, and triethylene diamine are typical examples of N-substituted triols and tetrols.

A very important class of chain extenders includes diamines. Aliphatic diamines react instantaneously while aromatic diamines and, in particular, hindered aromatic diamines (e.g., diamines containing substituents ortho to the amine groups) react considerably more slowly with isocyanates. Typical examples of aliphatic diamines include ethylene- and hexamethylenediamine. Cycloaliphatic diamines include isophorone diamine and 1,4-cyclohexyldiamine. Examples of aromatic diamines are methylene dianiline (MDA), phenylene diamines and tolylene diamines.

Among the hindered diamines 4,4'-methylene bis (o-chloro-aniline) (MOCA, E. I. duPont de Nemours & Co.) can be used herein. However, because of suspected carcinogenic activity, the U.S. Government agency OSHA has placed restrictions on its use. MOCA substitutes suitable for use herein include the dimethyl ester of 4,4'-methylenedianthranilic acid (MBMA) (Anderson Chemical Co.) and a sodium chloride coordination complex of 4,4'-methylene dianiline (Caytur 21, a predispersion of the coordination complex in dioctyl phthalate) (E. I. duPont de Nemours & Co.).

Other types of chain extenders and crosslinking agents which are commercially available include N,N',N''-tris (2-hydroxyethyl) isocyanurate (Allied Chemical Corp.), N,N'bis (2 hydroxyethyl) dimethyl-hydantoin (Glyco Chemical Co.) and dimethylolpropionic acid (Trojan Powder Co.-Commercial Solvent Corp.).

Of course, some crosslinking will be contributed to the final polymer by components (i) and (ii) themselves, particularly if the components contain high functionality ingredients. If chain extenders/crosslinkers are employed, they may be used in such an amount that the average molecular weight between crosslinks can be as low as about 300.

Components (i), (ii) and (iii) can be formulated for molding via a low pressure casting process, meaning that the coreactants are mixed in the liquid state and poured or injected into the final mold. Casting is well known and understood in the art, see for example *Polyurethane Technology*, edited by Paul F. Bruins, Interscience Publishers, especially Chapter 9 titled "Casting of Urethane Elastoplastics". The reactants are metered and mixed and poured into a mold in such a manner that air will not be entrapped. The reactants may be all mixed and poured together in a so-called one shot system. Alternatively, a so-called two-step prepolymer-curative process, wherein excess polyisocyanate is first reacted with a stoichiometrically deficient amount of active hydrogen compound to form an isocyanate-terminated prepolymer, followed by reacting the prepolymer with the remaining active hydrogen compound, may be employed.

The use of the formulations for molding into bowling bowls generally involves the use of a casting machine. Examples of casting machines include those offered commercially by Klockner Ferromatik Desma, Inc., West Concord, Massachusetts, including the DS 30/30 and PSA 91 models which can be used herein.

In the casting process, the polyisocyanate, component i, is referred to as the "A" component and the mixture of active hydrogen-containing compounds, component ii, including chain extenders, is referred to as the "B" component.

The slip agent compound, component (iii), can be incorporated into the casting formulation as part of the "A" component, although, because it is an active hydrogen compound, it is preferred to incorporate it as part of the "B" component. Advantageously, many of the slip agent compounds disclosed herein are generally soluble in the "B" component, making it a facile matter to mix the component so that it is uniform.

If it is desired to incorporate the slip agent into the "A" component comprising a polyisocyanate, the slip agent will prereact with the polyisocyanate if it is a fatty alcohol or a fatty amine. Care should be taken to insure that the "A" component is well mixed by using, for example, conventional propeller or paddle type stirrers.

If it is desired to incorporate an active hydrogen-containing polysiloxane slip agent into the "A" component, such can be accomplished with the aid of a silicone surfactant (substantially free of isocyanate reactivity) since the polysiloxane slip agents are substantially insoluble in polyisocyanates, as previously noted.

The silicone surfactants which are used as dispersing agents for the polysiloxane slip agent to make polyisocyanate liquid dispersions are modified polydialkyl siloxane polymers, especially polydimethyl-siloxanes. These materials are well known and readily commercially available in numerous modifications having side chains linked to the silicon atoms through linking groups composed of carbon and hydrogen; carbon, hydrogen and oxygen; carbon, hydrogen and sulfur; carbon, hydrogen and nitrogen; or carbon, hydrogen, oxygen and nitrogen. Those which are substantially free of isocyanate reactivity at temperatures below 25° C. and which are completely or partly stable to moisture are preferred. For the most part these silicone surfactants are made by grafting on organic side chains which are substantially free of isocyanate reactivity.

Silicone surfactants generally conform to the general formula:

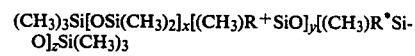

where the value of x, y or z vary from 10–1000 and where $R^+$ and $R^*$ may be the same or different and be selected from alkyl pendant radicals such as polyalkyl ether or alkoxyether groups such as $-CH_2CHRO(CH_2-CHRO)_m-C_mH_{2m+1}$ or $-OCH_2CHRO(CH_2-CHRO)_m-C_nH_{2n+1}$ where R is H, $-CH_3$, $-C_2H_5$ where the sum of m+n is such that the total formula weight of the polyoxyalkylene block and other grafted radicals ranges from 800–40,000, the polysiloxane block ranges from 15–70% of the molecular weight and n is 1–5; or grafted monovalent radicals selected from methoxy, ethoxy, ethylene, styrene, trifluoropropene, allyltetrahydro-furfuryl either, allyloxyethyl acetate, acrolein diethylacetal, allylcyanide, allyloxyethyl cyanide, allylmorpholine, allyl-chloride and others.

Specific suitable silicone surfactants are disclosed in U.S. Pat. No. 4,477,366, commonly assigned, herein incorporated by reference. The silicone surfactant can be used in an amount from 1 to 25 weight % based on the weight of the polysiloxane slip agent plus the silicone surfactant.

If additives are employed they are generally incorporated into the B component, although they may also be added to the A component so long as they are not isocyanate-reactive. The B component mixture, including additives, may be blended or agitated in a suitable container or supply tank, and agitated, generally at ambient temperature, although temperatures up to about 160° F. may be employed. Agitation can be conducted in the casting machine using conventional propeller type stirrers (generally supplied by the casting machine manufacturer) at RPM's of several hundred at most.

The "A" and "B" components are placed in separate containers, which are generally equipped with agitators, of the casting machine wherein the temperature of each component is preferably about 20° C. to about 30° C. Solvents are generally not used in casting since the A and B components are each already liquid. Molded polyurethane products are made by conducting each component via suitable metering pumps, to a mixing head where the components are mixed under low pressures, generally pressures less than 30 bar, preferably less than 20 bar. The mixed components can then be poured or injected into a mold in which, if desired, a rigid foam core of any suitable material known for such purpose has been centrally disposed.

Once a desired mold shape has been filled, the mold is closed and curing is effected. Generally curing temperatures of about 120° F. to about 160° F. can be used. Curing requires about 3 to 20 minutes, usually about 5 to 15 minutes. This rate of reactivity is ample to allow mixing and mold filling, yet sufficiently rapid to allow high rates of production.

The reaction of the "A" component and "B" component to make the polyurethanes of this invention is carried out at an isocyanate index between about 0.90 and about 1.30, preferably between about 0.95 and about 1.15. Most preferably, the reaction is carried out at an isocyanate index substantially equal to 1.10.

Although a detailed description of casting has been given above, the description is for the purpose of illustration. The bowling balls of this invention can also be made by other equally well known and understood molding technologies. The low pressure casting may be conducted using a static mixer in place of the mechanical mixing previously described. Molding may also be effectively conducted using high pressure mixing equipment. Different molding methods including reaction injection molding (RIM) technology may also be employed.

Bowling balls according to the invention have in fact been tested experimentally by professional bowlers who have attested to improved performance using the balls, the improved performance being manifested in the form of generally higher scores/pinfall, relative to conventional bowling balls not containing slip agents, these differences being manifested on a so-called short oil alley.

The invention is further described and disclosed by means of the following examples which are not to be taken as limiting. Amounts shown in the examples are in parts by weight (pbw), unless otherwise noted.

The following is a glossary of terms used in the examples:

GLOSSARY

Polyol 32-75
 An ethylene oxide-tipped triol having a hydroxyl number of 32, a functionality of 3, and a viscosity of 1000 centipoises (cps); Available commercially from ICI under the designation Daltocel T32-75.

VORANOL 800
 Trademark for a polyol having a hydroxyl number of 800, a functionality of 4, and a viscosity of 17000 cps; Available commercially from Dow Chemical.

VORANOL 2025
 Trademark for a polyol having a hydroxyl number of 660, a functionality of 3, and a viscosity of 850 cps. Available commercially from Dow Chemical.

1,4-butanediol
 Available commercially from GAF Corp.

Tin catalyst T12
 Dibutyl tin dilaurate, available from Metal and Thermit.

Dabco 33 LV
 33% triethylene diamine in dipropylene glycol. Available from Air Products.

Rubinate LF 179
 A urethane pseudoprepolymer modified derivative of pure 4,4'-diphenylmethane diisocyanate containing not more than 2% by weight of the 2,4'-diphenylmethane diisocyanate isomer, which derivative has a free isocyanate (-NCO) content of about 23.0% by weight and an average functionality of 2.00. Commercially available from Rubicon Chemicals, Inc.

EXAMPLE 1

Three bowling balls are made having outer shells of the following formulations 1A–1C (amounts in parts by weight, pbw):

|  | Example | | |
| --- | --- | --- | --- |
|  | 1A | 1B | 1C |
| Component B |  |  |  |
| Polyol 32-75 | 100.00 | 100.00 | 100.00 |
| 1,4-butanediol | 10.16 | 10.16 | 10.16 |
| VORANOL 800 | 22.25 | 22.25 | 22.25 |
| DABCO 33LV | 0.07 | 0.07 | 0.07 |
| Tin Catalyst T12 | 0.07 | 0.07 | 0.07 |
| Hydroxy reactive polysiloxane I | 0 | 3.00 | 6.00 |

Component A (1A–1C)

Rubinate LF 179 in an amount sufficient to achieve an isocyanate index of 1.15 when reacted with component B.

"Hydroxy reactive polysiloxane I", referred to above and in subsequent examples, has the following formula:

$$(CH_3)_3SiO[Si(CH_3)_2O]_{66}[Si(CH_3)(C_3H_6O(CH_2CH(CH_3)O)_{2.9}H)O]_3Si(CH_3)_3$$

For each bowling ball, components A and B are metered in the above proportions, mixed and dispensed into a bowling ball mold containing an accurately centered conventional rigid foam core (available commercially from Jasper Plastics, Indiana) located within the mold. The density of the rigid foam is about 18 lbs./cu.ft. The mixed liquid reactants are poured into the mold in a manner designed to eliminate trapped air bubbles within or on the surface of the molding. The hardness of the cured elastomer is about 78 Shore D for each ball.

The molding conditions were as follows:
Mold Temperature—140° F.
Demold time—10 Minutes
Rate of pour—10 lb./min.

Bowling balls made from formulation 1B and 1C exhibit lower friction traveling on a hardwood surface than a ball made from formulation 1A.

EXAMPLE 2

Three bowling balls are made as described in Example 1, the balls having outer shells made from the following formulations 2A-2C (amounts in pbw):

|  | Example | | |
|---|---|---|---|
|  | 2A | 2B | 2C |
| Component B |  |  |  |
| Polyol 32-75 | 100.00 | 100.00 | 100.00 |
| 1,4-butanediol | 10.16 | 10.16 | 10.16 |
| VORANOL 2025 | 54.00 | 54.00 | 54.00 |
| DABCO 33LV | 0.07 | 0.07 | 0.07 |
| Tin Catalyst ST T12 | 0.07 | 0.07 | 0.07 |
| Hydroxy reactive polysiloxane I | 0 | 3.00 | 6.00 |

Component A (2A-2C)

Rubinate LF 179 in an amount sufficient to achieve an isocyanate index of 1.15 when reacted with component B.

Each ball has a Shore D hardness of about 78.

Bowling balls made from formulations 2B and 2C exhibit lower friction traveling on a hardwood surface than a ball made from formulation 1A.

EXAMPLE 3

Two bowling balls are made as described in Example 1, the balls having outer shells made from the following formulations 3A-3B.

|  | Example | |
|---|---|---|
|  | 3A | 3B |
| Component B |  |  |
| Polyol 32-75 | 100.00 | 100.00 |
| 1,4-butanediol | 12.20 | 12.20 |
| VORANOL 800 | 26.70 | 26.70 |
| Tin Catalyst T12 | 0.07 | 0.07 |
| PRIMAROL 1511B | 0 | 7.00 |

Component A (3A-3B)

Rubinate LF 179 in an amount sufficient to achieve an isocyanate index of 1.15 when reacted with component B.

PRIMAROL 1511B, referred to above, is isohexacosanol, available from Henkel.

Both balls have a Shore D hardness of about 78.

The ball made from formulation 3B exhibits lower friction traveling on a hardwood surface than a ball made from formulation 3A.

EXAMPLE 4

Two bowling balls are made as described in Example 1, the balls having outer shells made from the following formulations 4A-4B.

|  | Example | |
|---|---|---|
|  | 4A | 4B |
| Component B |  |  |
| Polyol 32-75 | 100.00 | 100.00 |
| 1,4-butanediol | 12.20 | 12.20 |
| VORANOL 2025 | 64.83 | 64.83 |
| Tin Catalyst T12 | 0.07 | 0.07 |
| DABCO 33LV | 0.07 | 0.07 |
| PRIMAROL 1511B | 0 | 7.00 |

Component A (4A-4B)

Rubinate LF 179 in an amount sufficient to achieve an isocyanate index of 1.15 when reacted with component B.

Each ball has a Shore D hardness of about 78.

The ball made from formulation 4B exhibits lower friction traveling on a hardwood surface than a ball made from formulation 4A.

EXAMPLES 5-8

Examples 5-8 were conducted to show the reduced friction achievable with bowling balls, according to the invention, which contain slip agent compounds.

HORIZONTAL PLANE TEST

Test plaques as previously described were molded from the compositions of Examples 1-4 and were tested by ASTM D1894-78 to determine their friction when pulled as a "sled" carrying a 20 lb load across a horizontal surface designed to simulate a bowling lane. The horizontal surface was furniture grade cherry wood veneer on a one-half inch thick plywood substrate wherein the surface was finished with two coats of conventional alkyl varnish.

The apparatus used to apply force to pull the sled at constant speed across the horizontal surface was an Instron Tester set up to correspond with apparatus assembly illustration (c) of ASTM D1894-78. Two values were useful in assessing frictional engagement of the sled with the horizontal surface. The first was the frequency of oscillation (in oscillations/inch) which corresponded generally to the number of times per unit length the sled "grabbed" or frictionally engaged with the horizontal surface. The second was the amplitude of the oscillations which corresponded to the magnitude of the frictional drag with which the sled "grabbed" the horizontal surface as it was pulled. The two values together allowed a semi-quantitative assessment of frictional engagement of the horizontal surface with the sled. Relatively few oscillations of low magnitude indicated a relatively smooth travel of the test sled, i.e. that the sled "grabbed" with low frequency and relatively little force from the Instron was required to break each frictional engagement. Conversely, a high frequency of high amplitude oscillations indicated a much stronger frictional engagement, i.e. that the sled "grabbed" the horizontal surface more frequently and more strongly, corresponding to a relatively rough "chattering" as it was pulled.

The test plaques (sleds) were tested at least three days after molding.

INCLINED PLANE TEST

Test plaques molded from the compositions of Examples 1–4 were allowed to slide freely down a test (stainless steel) surface according to ASTM D3248, the angle at which the test plaques slid being recorded for use in calculating the coefficient of friction between the plaque and surface. The stainless steel test surface was supplied as standard equipment on a TMI coefficient of Friction Tester Model No. 98.25.

The test plaque weight was 214.0 grams. The lowest angle at which the plaque slid was recorded and used to calculate the coefficient of friction.

Results are presented in the Examples following

EXAMPLE 5

The following compositions 5A–5C correspond, respectively, to compositions 1A–1C.

|  | 5A | 5B | 5C |
|---|---|---|---|
| Horizontal Plane |  |  |  |
| Frequency (osc./inch) | 60 | 40 | 40 |
| Amplitude (inches) | 0.2 | 0.1 | 0.05 |
| Inclined Plane |  |  |  |
| Angle of slide (deg.) | 19 | 17 | 12 |
| Coeff. of frict. (calc.) | 0.34 | 0.31 | 0.21 |

EXAMPLE 6

The following compositions 6A–6C correspond, respectively, to compositions 2A–2C.

|  | 6A | 6B | 6C |
|---|---|---|---|
| Horizontal Plane |  |  |  |
| Frequency (osc./inch) | 60 | 40 | 30 |
| Amplitude (inches) | 0.2 | 0.1 | 0.05 |
| Inclined Plane |  |  |  |
| Angle of Slide (deg.) | 23 | 18 | 15 |
| Coeff. of frict. (calc.) | 0.42 | 0.32 | 0.27 |

EXAMPLE 7

The following compositions 7A and 7B correspond, respectively, to compositions 3A–3B.

|  | 7A | 7B |
|---|---|---|
| Horizontal Plane |  |  |
| Frequency (osc./inch) | 60 | 40 |
| Amplitude (inches) | 0.20 | 0.05 |
| Inclined Plane |  |  |
| Angle of slide (deg.) | 19 | 12 |
| Coeff. of frict. (calc.) | 0.34 | .021 |

EXAMPLE 8

The following compositions 8A–8B correspond, respectively, to compositions 4A–4B.

|  | 8A | 8B |
|---|---|---|
| Horizontal Plane |  |  |
| Frequency (osc./inch) | 60 | 50 |
| Amplitude (inches) | 0.2 | 0.05 |
| Inclined Plane |  |  |
| Angle of slide (deg.) | 23 | 15 |
| Coeff. of frict. (calc.) | 0.42 | 0.27 |

Those skilled in the art will appreciate that many modifications to the exemplary embodiments are possible without departing from the teachings herein. All such modifications are accordingly within the scope of the invention as defined in the claims appended hereto.

What is claimed is:

1. A bowling ball having at least an outer portion fabricated from reactants comprising
   (i) a polyisocyanate,
   (ii) an active hydrogen-containing compound having an average functionality of at least 2.0, and
   (iii) a slip agent compound containing a moiety which imparts lubricity to said ball, said slip agent compound also having at least one active hydrogen-containing group which is reactive with isocyanate groups, wherein said slip agent compound is present in an amount between about 0.5 and about 5 weight percent based on the weight of (i) and (ii), the ratio of (i) to the total of (ii) plus (iii) being such that the reaction is conducted at an isocyanate index between about 0.90 and about 1.30.

2. A bowling ball as defined in claim 1, wherein said slip agent (iii) is blended with said active hydrogen-containing compound (ii).

3. A bowling ball as defined in claim 2, wherein said active hydrogen-containing compound is a polyether polyol, a polyester polyol, an amine-terminated polyether, or a mixture thereof.

4. A bowling ball as defined in claim 3, wherein said polyether polyol or polyester polyol has a hydroxyl number between about 20 and about 150.

5. A bowling ball as defined in claim 4, wherein said hydroxyl number is between 28 and 56.

6. A bowling ball as defined in claim 3, wherein said polyether polyol or polyester polyol has an average hydroxyl functionality from 2 to 4 and an average hydroxyl equivalent weight of 500 to 3000.

7. A bowling ball as defined in claim 6, wherein said polyether polyol or polyester polyol has an average hydroxyl functionality from 2 to 3 and an average hydroxyl equivalent weight from 1000 to 2000.

8. A bowling ball as defined in claim 3, wherein said amine-terminated polyether has a molecular weight of 1000–10,000 with a preferred range of 2000 to 7000 and has the general formula;

$$H_2NCH_2-CXH(OCH_2CHX)_yNH_2$$

where X is H or alkyl group having 1–18 carbon atoms and where y is a number of about 20–200.

9. A bowling ball as defined in claim 3, wherein said amine-terminated polyether is a triamine of poly-alkoxylated trimethylol propane having the general formula:

$$CH_3CH_2C[CH_2(OCH_2-CHX)_zNH_2]_3$$

where z is an average of 10–100.

10. A bowling ball as defined in claim 2, wherein said slip agent compound is a fatty alcohol containing 10–40 carbon atoms.

11. A bowling ball as defined in claim 10, wherein said fatty alcohol contains 15-40 carbon atoms.

12. A bowling ball as defined in claim 11, wherein said fatty alcohol contains 16-30 carbon atoms.

13. A bowling ball as defined in claim 10, wherein said fatty alcohol is n-decyl alcohol, n-undecyl alcohol, n-dodecyl alcohol, n-tetradecyl alcohol, n-hexadecyl alcohol, n-octadecyl alcohol, or isostearyl alcohol.

14. A bowling ball as defined in claim 2, wherein said slip agent is a secondary monoamine of the formula $$R^1\text{-NH-}R^2$$

wherein $R^1$ is an aliphatic hydrocarbon group having from 10-40 carbon atoms and $R^2$ is an aliphatic hydrocarbon group containing 1-20 carbon atoms.

15. A bowling ball as defined in claim 2, wherein said slip agent consists essentially of 0.5-20 mol % of $R_aR'_bSiO_{[4-(a+b)]/2}$ Units and from 99.5-80 mol % of $R''_cSiO_{(4-c)/2}$ units where
R is an isocyanate reactive organic radical,
a has an average value of from 1-3,
R' and R" are hydrocarbon radicals or a substituted organic radical,
b has an average value of 0-2,
a+b is from 1-3,
c has an average value from 1 to 3, and
wherein
the ratio of the total molecular weight to the total number of isocyanate reactive functional groups in the polysiloxane molecule (equivalent weight) ranges from 100-3500,
the combined formula weights of all isocyanate reactive organic radicals, R do not exceed 40% of the total molecular weight of said polysiloxane slip agent,
the combined formula weights of all nonisocyanate reactive radicals, R'+R" together do not exceed 40% of the total molecular weight of said polysiloxane mold release additive,
the combined formula weights of all the organic radicals R+R'+R" in the molecule together do not exceed 60% of the total molecular weight of the molecule,
said polysiloxane slip agent contains an average of at least two isocyanate reactive functional groups per molecule,
at least two of the isocyanate reactive functional groups in each molecule are located on separate organic radicals, R, attached independently to different silicon atoms in said polysiloxane,
said isocyanate reactive functional groups (R) are selected from the group consisting of alcohols, phenols, thiols, primary or secondary aromatic amines, which contain no oxygen, and not more than one nitrogen, atoms attached directly to, in conjugation with, or incorporated within, the aromatic ring nucleus, and secondary aliphatic amines wherein at least one of the alkyl carbon atoms, bonded directly to the nitrogen atom, is not a primary carbon atom,
the molecular weight of said polysiloxane mold release agent ranges from 1000 to 30,000, and
said polysiloxane slip agent is substantially insoluble in liquid polyisocyanate.

16. A bowling ball as defined in claim 2, wherein said polyisocyanate comprises an aromatic polyisocyanate.

17. A bowling ball as defined in claim 16, wherein said polyisocyanate is selected from toluenediisocyanate, diphenylmethane diisocyanate, methylene bridged polyphenylmethane polyisocyanates, and isomers thereof.

18. A bowling ball as defined in claim 17, wherein said diphenylmethane diisocyanate is modified to contain carbodiimide groups, uretonimine groups, urethane groups, sulfonate groups, isocyanurate groups, urea groups or biuret groups such that it is a liquid at room temperature.

19. A bowling ball as defined in claim 1, wherein said slip agent compound (iii) is prereacted with or dispersed in said polyisocyanate (i).

20. A bowling ball as defined in claim 19, wherein said active hydrogen-containing compound is a polyether polyol, a polyester polyol, an amine-terminated polyether, or a mixture thereof.

21. A bowling ball as defined in claim 20, wherein said polyether polyol or polyester polyol has a hydroxyl number between about 20 and about 150.

22. A bowling ball as defined in claim 21, wherein said hydroxyl number is between 28 and 56.

23. A bowling ball as defined in claim 20, wherein said polyether polyol or polyester polyol has an average hydroxyl functionality from 2 to 4 and an average hydroxyl equivalent weight of 500 to 3000.

24. A bowling ball as defined in claim 23, wherein said polyether polyol or polyester polyol has an average hydroxyl functionality from 2 to 3 and an average hydroxyl equivalent weight from 1000 to 2000.

25. A bowling ball as defined in claim 20, wherein said amine-terminated polyether has a molecular weight of 1000-10,000 with a preferred range of 2000 to 7000 and has the general formula;

$$H_2NCH_2\text{-CXH(OCH}_2\text{CHX)}_y NH_2$$

where X is H or alkyl group having 1-18 carbon atoms and where y is a number of about 20-200.

26. A bowling ball as defined in claim 20, wherein said amine-terminated polyether is a triamine of polyalkoxylated trimethylol propane having the general formula:

$$CH_3CH_2C[CH_2(OCH_2\text{-CHX})_z NH_2]_3$$

where z is an average of 10-100.

27. A bowling ball as defined in claim 19, wherein said slip agent compound is a fatty alcohol containing 10-40 carbon atoms which is pre-reacted with said polyisocyanate.

28. A bowling ball as defined in claim 27, wherein said fatty alcohol contains 15-40 carbon atoms.

29. A bowling ball as defined in claim 28, wherein said fatty alcohol contains 16-30 carbon atoms.

30. A bowling ball as defined in claim 27, wherein said fatty alcohol is n-decyl alcohol, n-undecyl alcohol, n-dodecyl alcohol, n-tetradecyl alcohol, n-hexadecyl alcohol, n-octadecyl alcohol, or isostearyl alcohol.

31. A bowling ball as defined in claim 19, wherein said slip agent is a secondary monoamine of the formula $$R^1\text{-NH-}R^2$$

wherein $R^1$ is an aliphatic hydrocarbon group having from 10-40 carbon atoms and $R^2$ is an aliphatic hydrocarbon group containing 1-20 carbon atoms, said monoamine being pre-reacted with said polyisocyanate.

32. A bowling ball as defined in claim 19, wherein said slip agent is dispersed in said polyisocyanate and consists essentially of 0.5–20 mol % of $R_aR'_bSiO_{[4-(a+b)]/2}$ Units and from 99.5–80 mol % of $R''_cSiO_{(4-c)/2}$ units where R is an isocyanate reactive organic radical,
a has an average value of from 1–3,
R' and R" are hydrocarbon radical or a substituted organic radical,
b has an average value of 0–2,
a+b is from 1–3,
c has an average value from 1 to 3, and wherein
the ratio of the total molecular weight to the total number of isocyanate reactive functional groups in the polysiloxane molecule (equivalent weight) ranges from 100–3500,
the combined formula weights of all isocyanate reactive organic radicals, R do not exceed 40% of the total molecular weight of said polysiloxane mold release agent,
the combined formula weights of all nonisocyanate reactive radicals, R'+R" together do not exceed 40% of the total molecular weight of said polysiloxane slip agent,
the combined formula weights of all the organic radicals R+R'+R" in the molecule together do not exceed 60% of the total molecular weight of the molecule,
said polysiloxane slip agent contains an average of at least two isocyanate reactive functional groups per molecule,
at least two of the isocyanate reactive functional groups in each molecule are located on separate organic radicals, R, attached independently to different silicon atoms in said polysiloxane,
said isocyanate reactive functional groups (R) are selected from the group consisting of alcohols, phenols, thiols, primary or secondary aromatic amines, which contain no oxygen, and not more than one nitrogen, atoms attached directly to, in conjugation with, or incorporated within, the aromatic ring nucleus, and secondary aliphatic amines wherein at least one of the alkyl carbon atoms, bonded directly to the nitrogen atom, is not a primary carbon atom,
the molecular weight of said polysiloxane slip agent ranges from 1000 to 30,000, and
said polysiloxane slip agent is substantially insoluble in liquid polyisocyanate.

33. A bowling ball as defined in claim 19, wherein said polyisocyanate comprises an aromatic polyisocyanate.

34. A bowling ball as defined in claim 33, wherein said polyisocyanate is selected from toluenediisocyanate, diphenylmethane diisocyanate, methylene bridged polyphenylmethane polyisocyanates, and isomers thereof.

35. A bowling ball as defined in claim 34, wherein said diphenylmethane diisocyanate is modified to contain carbodiimide groups, uretonimine groups, urethane groups, sulfonate groups, isocyanurate groups, urea groups or biuret groups such that it is a liquid at room temperature.

36. A bowling ball as defined in claim 34, wherein said modified diphenylmethane diisocyanate is blended with methylene bridged polyphenylmethane polyisocyanates.

37. A bowling ball as defined in claim 19, wherein said polyisocyante is aliphatic.

38. A bowling ball as defined in claim 37, wherein said aliphatic polyisocyanate is blended with an aromatic polyisocyanate.

* * * * *